US009064280B2

(12) United States Patent
Lorbiecki et al.

(10) Patent No.: US 9,064,280 B2
(45) Date of Patent: Jun. 23, 2015

(54) ELECTRONIC COMMERCE CHECKOUT PROCEDURES OF A WEBSITE

(71) Applicant: Target Brands, Inc., Minneapolis, MN (US)

(72) Inventors: LeAnn Lorbiecki, Minneapolis, MN (US); Srinivas Junnuru, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 146 days.

(21) Appl. No.: 14/033,239

(22) Filed: Sep. 20, 2013

(65) Prior Publication Data
US 2015/0088695 A1 Mar. 26, 2015

(51) Int. Cl.
G06Q 30/06 (2012.01)
H04L 12/26 (2006.01)

(52) U.S. Cl.
CPC ............ *G06Q 30/0635* (2013.01); *H04L 43/16* (2013.01)

(58) Field of Classification Search
None
See application file for complete search history.

(56) References Cited

U.S. PATENT DOCUMENTS

| 5,897,622 | A * | 4/1999 | Blinn et al. ................. 705/26.81 |
| 6,279,001 | B1 | 8/2001 | DeBettencourt et al. |
| 7,152,102 | B2 | 12/2006 | Brinton et al. |
| 7,386,950 | B2 | 6/2008 | Fast et al. |
| 7,403,907 | B1 | 7/2008 | Gerken, III et al. |
| 7,606,900 | B2 | 10/2009 | Martin et al. |
| 7,734,726 | B2 | 6/2010 | Dantzig et al. |
| 8,112,471 | B2 | 2/2012 | Wei et al. |
| 8,175,923 | B2 | 5/2012 | Gerken, III et al. |
| 8,255,563 | B2 | 8/2012 | Audenaert et al. |
| 8,260,953 | B2 | 9/2012 | Audenaert et al. |
| 8,296,451 | B2 | 10/2012 | Lowery et al. |
| 8,543,900 | B1 * | 9/2013 | Kent ............................. 715/205 |
| 2006/0069763 | A1 | 3/2006 | Kido |
| 2006/0230144 | A1 | 10/2006 | Shah |
| 2007/0008884 | A1 | 1/2007 | Tang |
| 2011/0158097 | A1 | 6/2011 | Chang et al. |
| 2012/0185329 | A1 | 7/2012 | Audenaert et al. |

(Continued)

FOREIGN PATENT DOCUMENTS

| CA | 2547507 A1 | 10/2007 |
| WO | 0135293 A1 | 5/2001 |

OTHER PUBLICATIONS

Anonymous, Sears Holdings Ranked Third in Multichannel Retailer Web Traffic, Dec. 8, 2009; PR Newswire.*
Office Action from Canadian Patent Application No. 2,842,974, mailed Sep. 11, 2014 (3 pages).
Office Action from Canadian Patent Application No. 2,831,235, mailed May 7, 2014 (2 pages).

(Continued)

*Primary Examiner* — Jeffrey A Smith
*Assistant Examiner* — Brittany Bargeon
(74) *Attorney, Agent, or Firm* — Shumaker & Sieffert, P.A.

(57) ABSTRACT

In one example, a method includes transitioning, by a server system, from a full checkout procedure of a website to a reduced functionality checkout procedure of the website. The full checkout procedure includes calculations corresponding to a set of parameters associated with an electronic commerce transaction. The reduced functionality checkout procedure includes calculations corresponding to a subset of the parameters associated with the electronic commerce transaction. The method further includes receiving, by the server system and from a client device, a request to complete the electronic commerce transaction via the website, and in response to receiving the request to complete the electronic commerce transaction, executing, by the server system, the reduced functionality checkout procedure.

19 Claims, 10 Drawing Sheets

(56) References Cited

U.S. PATENT DOCUMENTS

| | | |
|---|---|---|
| 2012/0303697 A1 | 11/2012 | Alstad |
| 2013/0151322 A1* | 6/2013 | Coviello et al. ............ 705/14.23 |
| 2014/0089116 A1* | 3/2014 | Argue et al. .................... 705/21 |
| 2014/0214609 A1* | 7/2014 | Pedley et al. .............. 705/26.35 |

OTHER PUBLICATIONS

Office Action from Canadian Patent Application No. 2,831,235, mailed Jan. 9, 2014 (4 pages).

Office Action from Canadian Patent Application No. 2,831,241, mailed Jan. 21, 2014 (5 pages).

* cited by examiner

SHIPPING — 150

Enter Shipping Address — 152

First Name   Middle Initial   Last Name

Address

City   State   Zip Code

Choose Shipping Options

Edit or Remove Items — 155

Global Dark Trunk (in black)

156 → Eligible discounts will be applied before you submit payment

ELECTRONIC COMMERCE CHECKOUT PROCEDURES OF A WEBSITE

TECHNICAL FIELD

This disclosure relates to systems and methods for managing electronic commerce transactions via checkout procedures of a website.

BACKGROUND

Merchandisers may offer various products for sale via online electronic commerce (or "e-commerce") websites (e.g., online stores). Consumers may access the e-commerce website, select various products for purchase, and provide payment and other information (e.g., shipping information) to complete the e-commerce transaction using a checkout procedure provided by the e-commerce website. In some instances, network servers associated with the e-commerce website may experience heavy network traffic due to, for example, a holiday shopping season or a particular promotion. In some cases, such network traffic may exceed the capacity of the network servers to service the network traffic, thereby possibly resulting in a failure (or "crash") of the website.

SUMMARY

In general, this disclosure is directed to dynamically transitioning between a "full" checkout procedure and a reduced functionality checkout procedure of an online electronic commerce (e-commerce) website or online store. By transitioning from the full checkout procedure to the reduced functionality checkout procedure, a server system may help to reduce network traffic associated with customer checkout. In some instances, the server system may transition from the full checkout procedure to the reduced functionality checkout procedure during times of high network traffic associated with the e-commerce website due to, for example, online promotions or holiday shopping seasons.

According to various aspects of this disclosure, a server system may transition from a full checkout procedure that includes calculations corresponding to a set of parameters associated with an e-commerce transaction to a reduced functionality checkout procedure that includes calculations corresponding to a subset of the parameters associated with the e-commerce transaction. For example, each of the full checkout procedure and the reduced functionality checkout procedure may include a plurality of checkout pages. The plurality of checkout pages may include one or more preliminary checkout pages (e.g., a view shopping cart page, an edit shopping cart page, a shipping page, etc.) and a final checkout page (e.g., a review order and/or order placement page). The full checkout procedure may include calculations corresponding to a set of parameters associated with the e-commerce transaction, such as a calculations corresponding to a subtotal of costs of items associated with the e-commerce transaction (i.e., items included in the virtual shopping cart), discounts associated with items associated with the e-commerce transaction, shipping costs, estimated taxes to be applied, and the like.

According to techniques described herein, a server system may transition to a reduced functionality checkout procedure, the reduced functionality checkout procedure including calculations corresponding to a subset of the parameters associated with the e-commerce transaction. For instance, the server system may execute the reduced functionality checkout procedure such that calculations associated with certain of the parameters included in the full checkout procedure (e.g., item discounts, shipping costs, estimated taxes, gift wrapping options, etc.) are not presented at one or more of the preliminary checkout pages, thereby delaying calculations corresponding to the parameters and associated network traffic until presentation of the final checkout page. In this way, according to techniques described herein, a server system may decrease network traffic associated with customer checkout, thereby reducing network demands on the server system.

In one example, a method includes transitioning, by a server system, from a full checkout procedure of a website to a reduced functionality checkout procedure of the website. The full checkout procedure comprises calculations corresponding to a set of parameters associated with an electronic commerce transaction. The reduced functionality checkout procedure comprises calculations corresponding to a subset of the parameters associated with the electronic commerce transaction. The method further includes receiving, by the server system and from a client device, a request to complete the electronic commerce transaction via the website, and in response to receiving the request to complete the electronic commerce transaction, executing, by the server system, the reduced functionality checkout procedure.

In one example, a system includes at least one server device configured to transition from a full checkout procedure of a website to a reduced functionality checkout procedure of the website. The full checkout procedure comprises calculations corresponding to a set of parameters associated with an electronic commerce transaction. The reduced functionality checkout procedure comprises calculations corresponding to a subset of the parameters associated with the electronic commerce transaction. The system further includes at least one client device configured to transmit, to the at least one server device, a request to complete the electronic commerce transaction via the website. The at least one server device is further configured to execute, in response to receiving the request to complete the electronic commerce transaction, the reduced functionality checkout procedure.

In one example, a computer-readable storage medium is encoded with instructions that, when executed, cause at least one processor of a computing device to transition from a full checkout procedure of a website to a reduced functionality checkout procedure of the website. The full checkout procedure comprises calculations corresponding to a set of parameters associated with an electronic commerce transaction. The reduced functionality checkout procedure comprises calculations corresponding to a subset of the parameters associated with the electronic commerce transaction. The computer-readable storage medium is further encoded with instructions that, when executed, cause the at least one processor of the computing device to receive a request to complete the electronic commerce transaction via the website, and in response to receiving the request to complete the electronic commerce transaction, execute the reduced functionality checkout procedure.

The details of one or more aspects of this disclosure are set forth in the accompanying drawings and the description below. Other features and advantages will be apparent from the description and drawings, and from the claims.

BRIEF DESCRIPTION OF DRAWINGS

FIG. 6B is a block diagram illustrating an example shipping page that may be presented during execution of a reduced functionality checkout procedure, in accordance with one or more aspects of this disclosure.

DETAILED DESCRIPTION

Techniques of this disclosure are directed to transitioning between a full checkout procedure and a reduced functionality checkout procedure of an online electronic commerce (e-commerce) website or online store. In some instances, network servers of an e-commerce website may experience heavy network traffic due to, for example, a holiday shopping season or a particular promotion (e.g., a limited time offer of a product, a limited time offer at a reduced price, etc.). Such network traffic may, in certain examples, exceed the capacity of the network servers to service the traffic, thereby possibly resulting in a "crash" of the website.

According to techniques described herein, a server system may help to decrease network traffic associated with one or more e-commerce transactions by transitioning from a full checkout procedure to a reduced functionality checkout procedure. The reduced functionality checkout procedure may include calculations corresponding to a subset of parameters associated with an e-commerce transaction included in a full checkout procedure. In this way, a user may still be able to access the website during periods of high network traffic, but may be presented with a different checkout procedure when completing an e-commerce transaction.

The reduced functionality checkout procedure may delay certain calculations until a final checkout page of the checkout procedure is presented and/or remove certain options from the checkout procedure entirely. For example, a reduced functionality checkout procedure may refrain from calculating and/or presenting results of calculations associated with promotional discounts, shipping costs, estimated taxes, total costs, and the like at one or more preliminary pages of the checkout procedure, such as at a view cart page, a shipping page, an edit cart page, etc. In this way, the reduced functionality checkout procedure may delay calculations associated with one or more parameters associated with the e-commerce transaction (and the corresponding network traffic) until a final checkout page is presented. Accordingly, a server system implementing techniques of this disclosure may help reduce network traffic associated with checkout procedures of an e-commerce website, thereby increasing usability of the website and customer satisfaction during periods of high network traffic.

Figure 1:
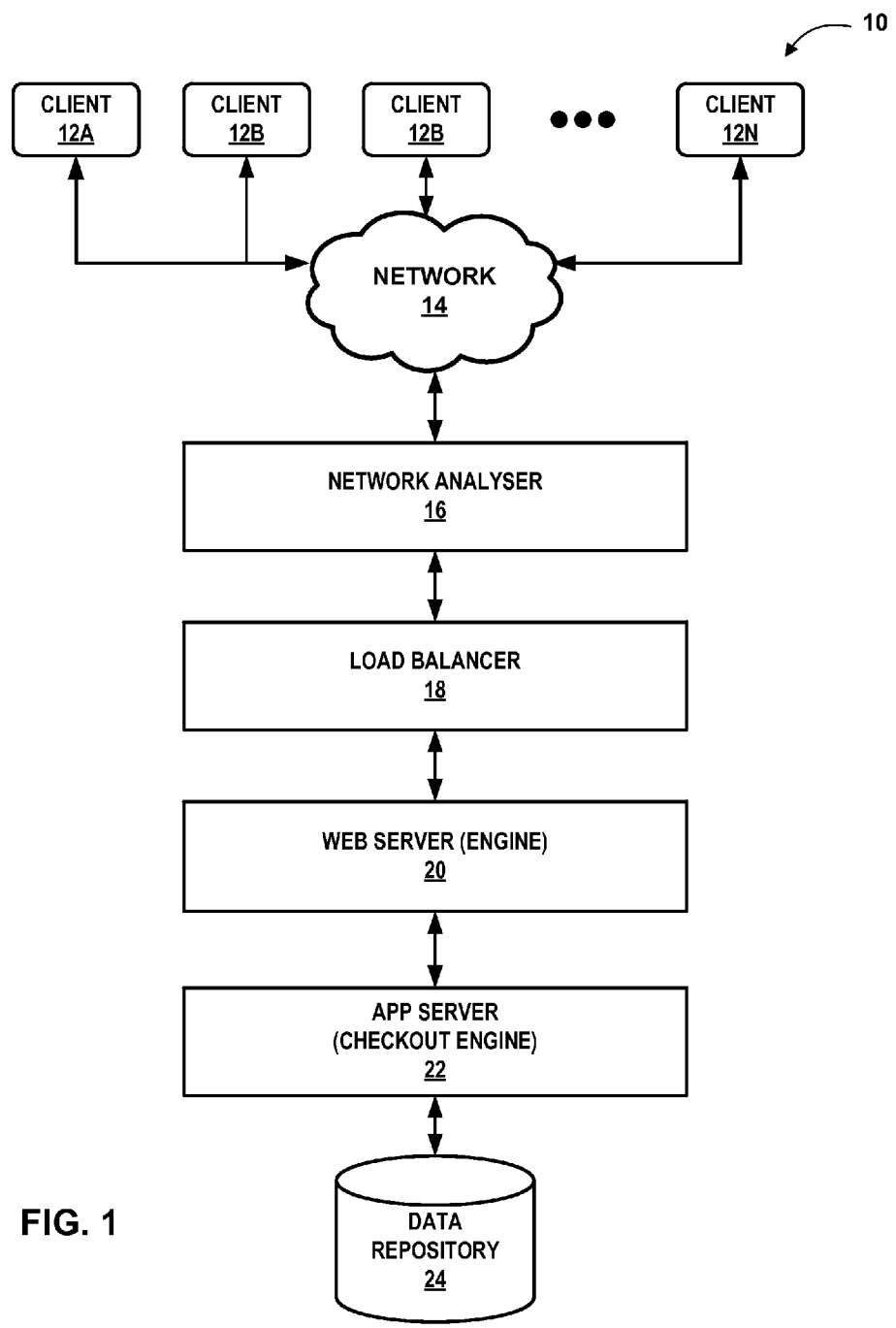
FIG. 1 is a conceptual diagram illustrating an example system for transitioning between a full checkout procedure of a website and a reduced functionality checkout procedure of the website, in accordance with one or more aspects of this disclosure.

FIG. 1 is a conceptual diagram illustrating an example system 10 for transitioning between a full checkout procedure of a website and a reduced functionality checkout procedure of the website, in accordance with one or more aspects of this disclosure. As illustrated in FIG. 1, system 10 may include client computing devices 12A-12N (collectively referred to herein as "clients 12" or individually as "client 12"), a network 14, a network analyzer 16, a load balancer 18, a web server (engine) 20, and an application server including a checkout engine 22 and a data repository 24. Clients 12 may be communicatively coupled to system components 16-22 and data repository 24 via network 14. Web server (engine) 20 may be configured to present an e-commerce website that may enable a user to purchase products and/or services via a checkout procedure of the website. Checkout engine 22 may execute one or more checkout procedures associated with the e-commerce website to enable an e-commerce transaction via the website. Checkout engine 22 may transition between a full checkout procedure and a reduced functionality checkout procedure, in accordance with techniques described herein. In this manner, system 10, and other systems according to this disclosure including similar capabilities, may be employed to present an e-commerce website that may enable a user to purchase items and/or services offered for sale via the e-commerce website.

Clients 12 may include any number of different portable electronic mobile devices, including, e.g., cellular phones, personal digital assistants (PDA's), laptop computers, portable gaming devices, portable media players, e-book readers, watches, as well as non-portable devices such as desktop computers. Clients 12 may include one or more input/output devices configured to allow user interaction with one or more programs configured to communicate with web server engine 20. In one example, clients 12 include client computers from which users may access and interact with web server engine 20. In one example, clients 12 run a web browser that accesses and presents a web application executing on web server 20 or another device, and allows a user to browse for items and/or services to purchase from a retailer associated with the website. In another example, clients 12 execute an application outside of a web browser (e.g., an operating system specific application) that accesses and presents information processed by web server engine 20 or another device.

Network 14 may include one or more terrestrial and/or satellite networks interconnected to communicatively connect clients 12 to web server engine 20 and data repository 24. In one example, network 14 is a private or public local area network (LAN) or Wide Area Network (WAN), such as the Internet. Network 14 may include both wired and wireless communications according to one or more standards and/or via one or more transport mediums. In one example, network 14 includes wireless communications according to one of the 802.11 or Bluetooth specification sets, or another standard or proprietary wireless communication protocol. Network 14 may also include communications over a terrestrial cellular network, including, e.g., a GSM (Global System for Mobile Communications), CDMA (Code Division Multiple Access), and/or EDGE (Enhanced Data for Global Evolution) network. Data transmitted over network 14, e.g., from clients 12 to web server engine 20 may be formatted in accordance with a variety of different communications protocols. For example, all or a portion of network 14 may be a packet-based, Internet Protocol (IP) network that communicates data from clients 12 to web server engine 20 in Transmission Control Protocol/Internet Protocol (TCP/IP) packets, over, e.g., Category 5, Ethernet cables.

Network analyzer 16 may be configured to analyze network traffic associated with a website, such as a website presented by web server engine 20. Load balancer 18 distributes workload at the website across multiple computing devices so as to provide a single internet service from multiple computing devices. To do so, load balancer 18 may monitor the port(s) where clients 12A-12N connect to access web services. Load balancer 18 may forward and/or distribute requests to one or more "backend" servers or computing devices. This allows load balancer 18 to reply to the client(s) 12A-12N without the client ever knowing about the internal separation of functions.

Data repository 24 may include, e.g., a standard or proprietary electronic database or other data storage and retrieval mechanism. In one example, data repository 24 includes one or more databases, such as relational databases, multi-dimensional databases, hierarchical databases, object-oriented databases, or one or more other types of databases. Data repository 24 may be implemented in any non-transitory computer readable medium, including software, hardware, and combinations of both. In one example, data repository 24 includes proprietary database software stored on one or a variety of storage mediums on a data storage server connected to network 14 and configured to store information associated with products and/or services available for purchase from a retailer associated with an e-commerce website. Storage media included in or employed in cooperation with data repository 24 may include, e.g., any volatile, non-volatile, magnetic, optical, or electrical media, such as random access memory (RAM), read-only memory (ROM), nonvolatile RAM (NVRAM), electrically-erasable programmable ROM (EEPROM), flash memory, or any other digital media.

Data repository 24 may store information associated with products and/or services offered by a retailer associated with an e-commerce website, such as items and/or services offered for sale by the retailer. As one example, data repository 24 may store information associated with such products and/or services, such as cost information, product and/or service description information, promotional and/or discount information, tax information, and the like. Web server engine 20 may periodically retrieve product and/or service information from data repository 24, such as during a checkout procedure associated with an e-commerce website presented by web engine 20.

As illustrated in the example of FIG. 1, system 10 includes an application server including checkout engine 22. Checkout engine 22 may be employed, as further described below, to present a checkout procedure of a website (e.g., a website presented by web server engine 20) to enable an e-commerce transaction to purchase products and/or services via the website. One or more web servers 20 may include any of one or more different types of network devices, such as data processing appliances, web servers, specialized media servers, network access controllers, personal computers operating in a peer-to-peer fashion, or other types of network devices. Accordingly, although one or more servers 20 of FIG. 1 is illustrated with respect to one server device 20, one or more server devices 20 may include any number of collocated and/or distributed server devices configured to present an e-commerce website and complete an e-commerce transaction via one or more checkout procedures of the website.

Regardless of the particular configuration of system 10, or other example systems according to this disclosure, the system may be employed to present a website and complete an e-commerce transaction to purchase products and/or services via a checkout procedure of the website. As an example, web server engine 20 may present a website associated with a retailer. A retailer may be considered an entity that provides services and/or retails merchandise through physical retail stores and/or through Internet-based stores (e.g., online stores presented via an e-commerce website). In the case of retailers that sell products and/or services through Internet-based stores, such retailers may present e-commerce websites that enable users to browse for items and/or services to purchase (e.g., using one or more client computing devices, such as one or more of clients 12). For instance, one or more servers 20 may include a web server that presents (e.g., serves) an e-commerce website including information associated with one or more products (e.g., price information, product descriptions, etc.) and enables a user to select one or more of the products and/or services for purchase, such as by adding the one or more products and/or services to a virtual shopping cart included in the e-commerce website. The e-commerce website may enable a user to complete an e-commerce transaction to purchase products and/or services (e.g., products and/or services included in the virtual shopping cart), such as by selecting a "checkout" option presented by the e-commerce website.

As an example, one or more users may access, via one or more of client devices 12, an e-commerce website presented by web server engine 20. The e-commerce website may enable users to browse for products and/or services available for purchase via the website. In certain examples, the website may enable users to select various products and/or services for purchase, such as by adding such products and/or services to a virtual shopping cart. In some examples, the e-commerce website may present a checkout option that initiates a checkout procedure to complete an e-commerce transaction associated with the one or more products and/or services.

Checkout engine 22, executing on the application server or another computing device, may complete the e-commerce transaction via one or more checkout procedures of the website. For example, checkout engine 22 may execute one or more of a full checkout procedure and a reduced functionality checkout procedure. In some examples, each of the full checkout procedure and the reduced functionality checkout procedure may include a plurality of checkout pages. The plurality of checkout pages may include one or more preliminary checkout pages and a final checkout page. For instance, the one or more preliminary checkout pages may include a view cart page, a shipping page, a multiple shipping page, a gift wrap page, an extended service plan page, a payment page, an edit cart page, or other preliminary checkout pages. The final checkout page may include an order review page or other such page that that presents an option to place the order for the products and/or services and thereby finalize the e-commerce transaction by completing the financial transaction (e.g., by charging a credit card, debit card, check card, gift card, or other monetary transaction).

A full checkout procedure may include calculations corresponding to a set of parameters associated with the e-commerce transaction. For instance the set of parameters included in the full checkout procedure may include parameters such as a sub-total of the costs of products and/or services associated with the e-commerce transaction, one or more discounts associated with the e-commerce transaction, shipping costs associated with the e-commerce transaction, estimated tax associated with the e-commerce transaction, a total cost of products and/or services associated with the e-commerce transaction (e.g., the sub-total of the costs added to the shipping and estimated tax, less any discounts associated with the transaction), or other such parameters. In certain examples, the full checkout procedure may include parameters such as multiple shipping parameters (e.g., multiple shipping addresses to which one or more of the products are shipped), gift wrapping parameters (e.g., options and/or costs associated with gift wrapping one or more of the products), extended service plan parameters (e.g., options such as service plan levels and/or costs associated with extended warranty or other service options associated with one or more of the products and/or services), and the like. In certain examples, checkout engine 21 may execute the full checkout procedure, thereby presenting results of calculations corresponding to the one or more parameters associated with the e-commerce transaction at one or more of the preliminary checkout pages and/or the final checkout page.

Checkout engine 22 may transition from the full checkout procedure to a reduced functionality checkout procedure. For instance, in certain examples, checkout engine 22 may transition from the full checkout procedure to the reduced functionality checkout procedure in response to receiving an indication of a configuration command to transition from the full checkout procedure to the reduced functionality checkout procedure. For example, a user, such as a system administrator, may access one or more of servers 18 to initiate the transition from the full checkout procedure to the reduced functionality checkout procedure via the configuration command.

In some examples, checkout engine 22 may transition from the full checkout procedure to the reduced functionality checkout procedure in response to determining that network traffic associated with the website satisfies a threshold value. The threshold value may correspond to a threshold network bandwidth (e.g., a minimum available bandwidth), a number of client devices accessing the website (e.g., a maximum number of client devices), an amount of network data traffic associated with the website (e.g., a maximum amount of data transmitted and/or received by one or more servers associated with the website), or other measures of network traffic associated with the website and/or one or more servers associated with the website. In response to determining that the network traffic satisfies the threshold value, server 20 may cause checkout engine 22 to transition from the full checkout procedure to the reduced functionality checkout procedure. In this way, one or more servers 18 may cause checkout engine 22 to automatically transition from the full checkout procedure to the reduced functionality checkout procedure (i.e., without requiring intervention by a user, such as a network administrator).

The reduced functionality checkout procedure may include calculations associated with a subset of the parameters included in the full checkout procedure. That is, the reduced functionality checkout procedure may include calculations associated with some, but not all of the parameters included in the full checkout procedure. As an example, one or more of the preliminary checkout pages may include parameters associated with the e-commerce transaction, such as a subtotal of costs of items associated with the e-commerce transaction, shipping costs of items associated with the e-commerce transaction, estimated taxes to be applied to items associated with the e-commerce transaction, and a total cost of the e-commerce transaction. In such an example, checkout engine 22 may execute the reduced functionality checkout procedure such that calculations associated with the subtotal of costs of items are performed and the resulting values presented at one or more of the preliminary checkout pages, but calculations associated with discounts, shipping costs, estimated taxes, and total costs of the e-commerce transaction are not performed and resulting values are not presented at the one more preliminary checkout pages. In some examples, checkout engine 22 may execute the reduced functionality checkout procedure such that calculations associated with the set of parameters included in the full checkout procedure are performed and presented at the final checkout page, thereby presenting a user with the associated information prior to finalizing the e-commerce transaction.

In certain examples, checkout engine 22 may execute the reduced functionality checkout procedure such that one more parameters included in the full checkout procedure are not included in the reduced functionality checkout procedure. For instance, checkout engine 22 may not present gift wrapping options, multiple shipping options, extended service plan options, promotional code options, or one or more other options as part of the reduced functionality checkout procedure. In this way, checkout engine 22 may further reduce calculations and corresponding network traffic associated with the reduced parameters.

Accordingly, a system implementing techniques of this disclosure may reduce calculations and corresponding network traffic between one or more server devices and one or more client devices associated with e-commerce transactions of a website. In this way, techniques of this disclosure may enable a server system to present an e-commerce website and enable each customer of the e-commerce website to browse for products and/or services available via the website and purchase such products and/or services even during periods of high network traffic associated with website. As such, the techniques may increase usability of the e-commerce website, thereby helping to increase sales throughput via the website and user satisfaction with the online shopping experience.

Figure 2:
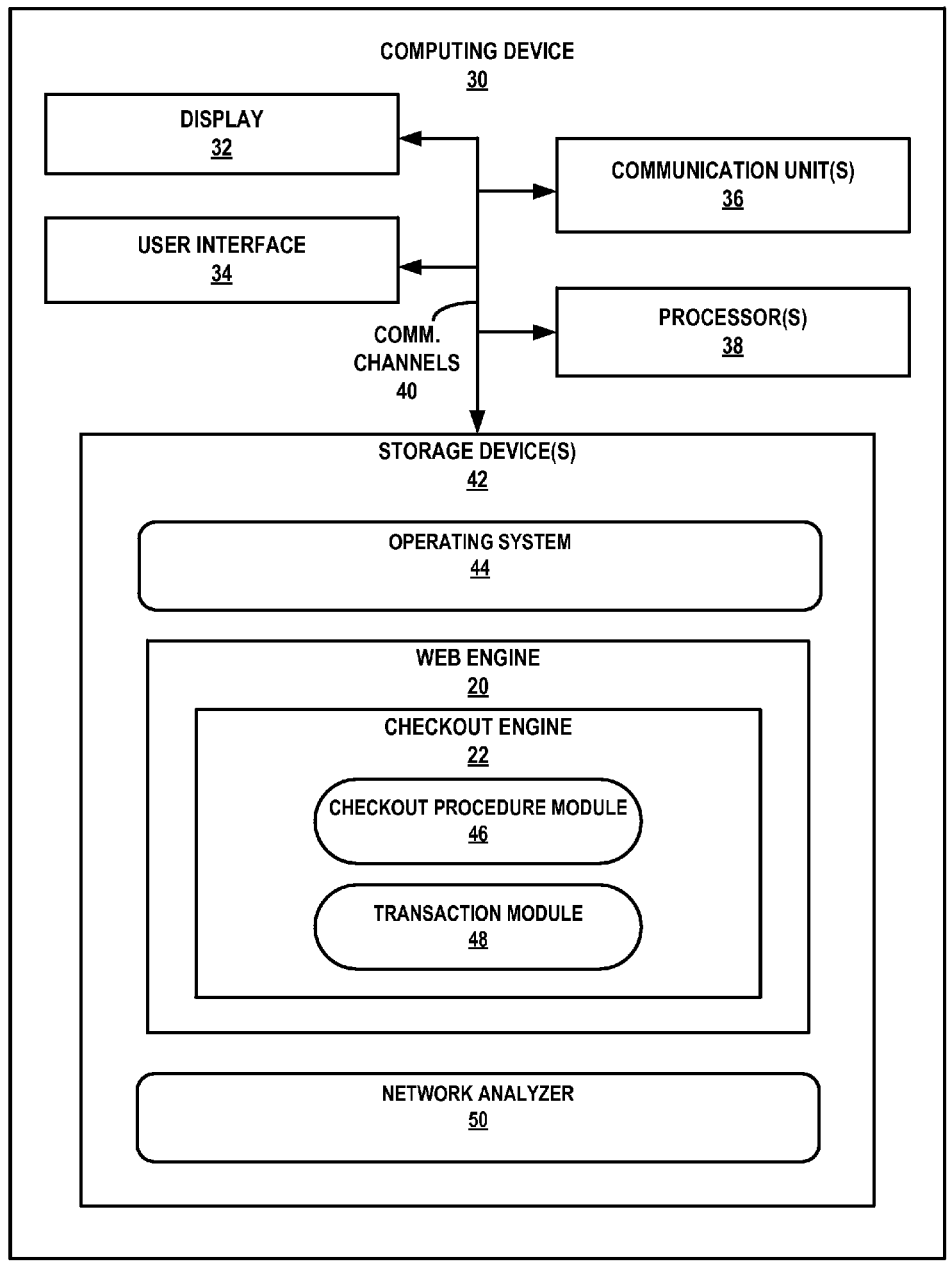
FIG. 2 is a block diagram illustrating an example computing device that may transition between a full checkout procedure of a website and a reduced functionality checkout procedure of the website, in accordance with one or more aspects of this disclosure.

FIG. 2 is a block diagram illustrating an example computing device 30 that may transition between a full checkout procedure of a website and a reduced functionality checkout procedure of the website, in accordance with one or more aspects of this disclosure. FIG. 2 illustrates only one example of computing device 30, and many other examples of computing device 30 may be used in other instances. In addition, although discussed with respect to one computing device 30, one or more components and functions of computing device 30 may be distributed among multiple computing devices 30.

Computing device 30, in certain examples, may be substantially similar to server device 20 of FIG. 1. As such, examples of computing device 30 include, but are not limited to, various types of network devices such as a data processing appliance, web server, specialized media server, network access controller, personal computer operating in a peer-to-peer fashion, or another type of network device. Additional examples of computing device 30 may include, but are not limited to, computing devices such as desktop computers, workstations, network terminals, and portable or mobile devices such as personal digital assistants (PDAs), mobile phones (including smart phones), tablet computers, laptop computers, netbooks, ultrabooks, and others. In this manner, computing device 30 may be substantially similar to one or more of client devices 12 of FIG. 1.

As shown in the example of FIG. 2, computing device 30 includes display 32, user interface 34, one or more communication units 36, one or more processors 38, and one or more storage devices 42. As illustrated, computing device 30 further includes web engine 20, operating system 44, and network analyzer 50. Web engine 20 may include checkout engine 22. As illustrated, checkout engine 22 may include checkout procedure module 46 and transaction module 48. Each of components 32, 34, 36, 38, and 42 are interconnected (physically, communicatively, and/or operatively) for inter-component communications. In some examples, communication channels 40 include a system bus, network connection, inter-process communication data structure, or any other channel for communicating data. As one example in FIG. 2, components 32, 34, 36, 38, and 42 are coupled by one or more communication channels 40. Web engine 20, checkout engine 22, checkout procedure module 46, transaction module 48, network analyzer 50, and operating system 44 may also communicate information with one another as well as with other components of computing device 30.

Display 32 may be a liquid crystal display (LCD), e-ink, organic light emitting diode (OLED), or other display. Display 32 may present the contents output by applications executing on computing device 30 and/or notifications presented by computing device 30 to a user. For example, display 32 may display the output of checkout engine 20 executed on one or more processors 38 of computing device 30, confirmation messages, indications, or other functions that may need to be presented to a user. In some examples, display 32 provides some or all of the functionality of a user interface of computing device 30. For instance, display 32 may be a touch-sensitive and/or presence-sensitive display that may display a graphical user interface (GUI) and detect input from a user in the form of user input gestures using capacitive or inductive detection at or near the presence-sensitive display.

User interface 34 may allow a user of computing device 30 to interact with computing device 30. Examples of user interface 34 may include, but are not limited to, a keypad embedded on computing device 30, a keyboard, a mouse, a roller ball, buttons, or other devices that allow a user to interact with computing device 30. In some examples, computing device 30 may not include user interface 34, and the user may interact with computing device 30 using display 32 (e.g., by providing various user gestures). In some examples, a user may interact with computing device 30 using user interface 34 and display 32.

Computing device 30, in some examples, also includes one or more communication units 36. Computing device 30, in one example, utilizes one or more communication units 36 to communicate with external devices (e.g., clients 12 of FIG. 1) via one or more networks, such as one or more wireless networks, one or more cellular networks, or other types of networks. One or more of communication units 36 may be a network interface card, such as an Ethernet card, an optical transceiver, a radio frequency transceiver, or any other type of device that can send and receive information. Other examples of such network interfaces include Bluetooth, 3G and Wi-Fi radio computing devices as well as Universal Serial Bus (USB).

One or more processors 38 (hereinafter "processors 38"), in one example, are configured to implement functionality and/or process instructions for execution within computing device 30. For example, processors 38 are capable of processing instructions stored at one or more storage devices 42, which include, in some examples, instructions for executing functions attributed to network analyzer 50, web engine 20, and the modules thereof. Examples of processors 38 include any one or more of a microprocessor, a controller, a digital signal processor (DSP), an application specific integrated circuit (ASIC), a field programmable gate array (FPGA), or equivalent discrete or integrated logic circuitry.

One or more storage devices 42 (hereinafter "storage devices 42") may be configured to store information within computing device 30 during operation. Storage devices 42, in some examples, are described as a non-transitory computer-readable storage medium. In some examples, storage devices 42 include a temporary memory, meaning that a primary purpose of one or more storage devices 42 is not long-term storage. Storage devices 42 are, in some examples, described as a volatile memory, meaning that storage devices 42 do not maintain stored contents when the computer is turned off. Examples of volatile memories include random access memories (RAM), dynamic random access memories (DRAM), static random access memories (SRAM), and other forms of volatile memories known in the art. In some examples, storage devices 42 are used to store program instructions for execution by one or more processors 38. Storage devices 42, for example, are used by software or applications running on computing device 30 (e.g., checkout engine 21) to temporarily store information during program execution.

Storage devices 42, in some examples, also include one or more computer-readable storage media. Storage devices 42 may be configured to store larger amounts of information than volatile memory. Storage devices 42 may further be configured for long-term storage of information. In some examples, storage devices 42 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

As illustrated in the example of FIG. 2, computing device 30 includes web engine 20 and a network analyzer 50. Network analyzer 50 may be configured to analyze network traffic associated with a website, such as a website presented by web engine 20. For example, network analyzer 50 may monitor incoming traffic at the web site level and determine whether the network traffic at the web site satisfies one or more threshold values. If the one or more thresholds are satisfied, checkout engine 22 may transition from the full checkout procedure to a reduced functionality checkout procedure.

In other examples, network analyzer 50 may analyze network traffic associated with computing device 30 and/or the website presented by web engine 20. For instance, network analyzer 50 may analyze network bandwidth, network throughput, a number of client devices accessing computing device 30 via a website presented by web engine 20, or other measures of network traffic associated with computing device 30. In certain examples, network analyzer 50 may determine that network traffic associated with computing device 30 satisfies a threshold value. For instance, network analyzer 50 may determine that available network bandwidth of computing device 30 is less than (or equal to) a threshold bandwidth value. As another example, network analyzer 50 may determine that network throughput of computing device 30 is greater than (or equal to) a threshold throughput value. As yet another example, network analyzer 50 may determine that a number of client devices accessing computing device 30 is greater than (or equal to) a threshold number of devices. In some examples, functionality attributed to network analyzer 50 may be performed by one or more computing devices remote from computing device 30, such as a network access controller, and/or distributed among computing device 30 and one or more other computing devices.

In certain examples, in response to determining that the network traffic satisfies the threshold value, network analyzer 50 may cause checkout engine 22 to transition from the full checkout procedure to a reduced functionality checkout procedure. Checkout procedure module 46 of checkout engine 22 may be configured to transition web server engine 20 from the full checkout procedure to the reduced functionality checkout procedure with respect to one or more client devices accessing the e-commerce website provided by web server engine 20. Transaction module 48 may be configured to execute the reduced functionality checkout procedure and complete the e-commerce transaction via the e-commerce website.

Although shown as separate components in FIG. 2, in some examples, one or more of web engine 20, checkout engine 22, checkout procedure module 46, transaction module 48, and network analyzer 50 may be part of the same module. In some examples, one or more of web engine 20, checkout engine 22, checkout procedure module 46, transaction module 48, and network analyzer 50 may be formed in a common hardware unit. In some instances, one or more of web engine 20, checkout engine 22, checkout procedure module 46, transaction module 48, and network analyzer 50 may be software and/or firmware units that are executed on processors 38. In general, the modules of web engine 20, checkout engine 22, checkout procedure module 46, transaction module 48, and network analyzer 50 are presented separately for ease of description and illustration. However, such illustration and description should not be construed to imply that these modules are necessarily separately implemented, but can be in some examples.

Additionally, although the foregoing examples have been described with reference to web engine 20 including checkout engine 22, and checkout engine 22 including checkout procedure module 46 and transaction module 48, in other examples such functions and/or processing engines or other mechanisms configured to operate in accordance with the disclosed examples may be physically and/or logically differently arranged. A wide variety of other logical and physical arrangements are possible in order to implement the functionality attributed to the examples of web engine 20, checkout engine 22, checkout procedure module 46, transaction module 48, and network analyzer 50 illustrated in FIGS. 1 and 2.

As illustrated in FIG. 2, computing device 30 may include operating system 44. Operating system 44, in some examples, controls the operation of components of computing device 30. For example, operating system 44, in one example, facilitates the communication of web engine 20, checkout engine 21, checkout procedure module 46, transaction module 48, and network analyzer 50 with processors 38, display 32, user interface 34, and communication units 36.

Computing device 30 may include additional components not shown in FIG. 2. For example, computing device 30 may include a batter to provide power to the components of computing device 30. Similarly, the components of computing device 30 may not be necessary in every example of computing device 30. For instance, in certain examples, computing device 30 may not include display 32.

Figure 3:
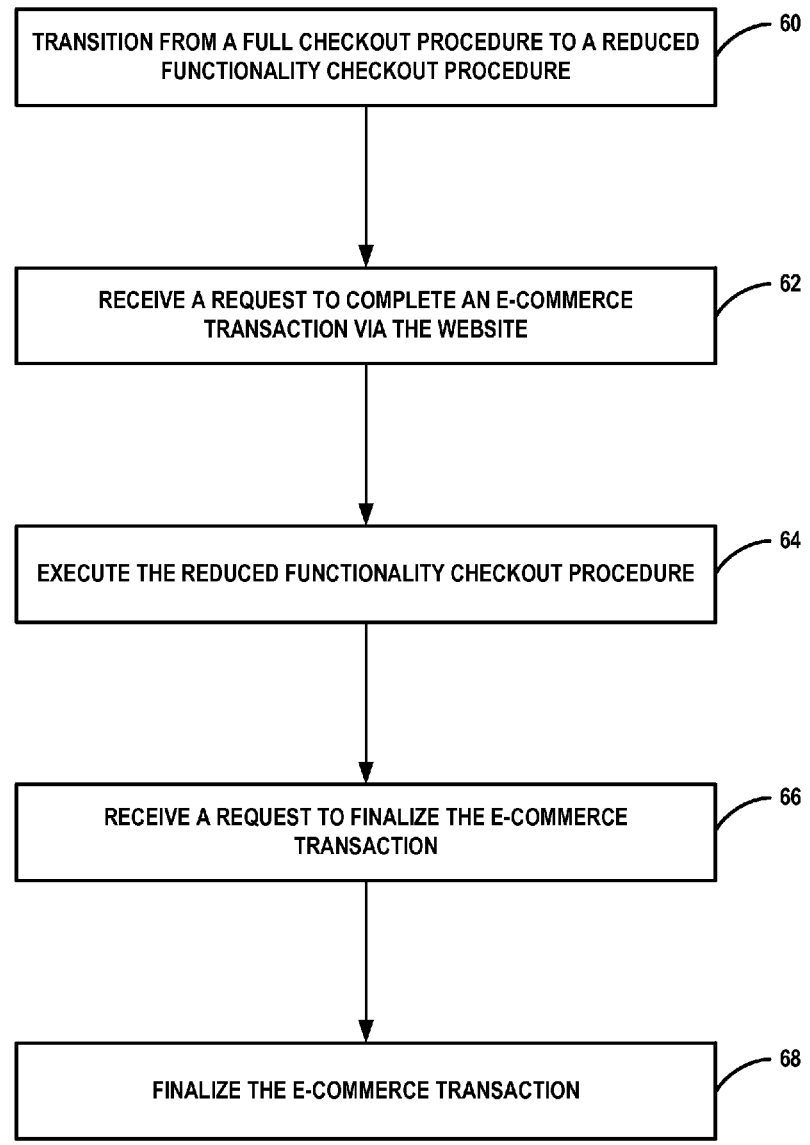
FIG. 3 is a flow diagram illustrating example operations of a server system to transition between a full checkout procedure of a website and a reduced functionality checkout procedure of the website, in accordance with one or more aspects of this disclosure.

FIG. 3 is a flow diagram illustrating an example process by which a system, such as system 10 shown in FIG. 1, may transition from a full checkout procedure of a website and a reduced functionality checkout procedure of the website, in accordance with one or more aspects of this disclosure. For purposes of illustration only, the example operations are described below within the context of system 10 of FIG. 1 and computing device 30 of FIG. 2.

Checkout procedure module 46, executing on one or more processors 38 of computing device 30, may transition from a full checkout procedure of a website (e.g., a website executed and presented by web engine 20) to a reduced functionality checkout procedure of the website (60). For example, checkout procedure module 46 may transition from the full checkout procedure to the reduced functionality checkout procedure in response to receiving an indication of a configuration command to transition from the full functionality checkout procedure to a reduced functionality checkout procedure. Checkout procedure module 46 may receive an indication of a configuration command provided by, for example, a user, to transition from the full checkout procedure to the reduced functionality checkout procedure. For example, the configuration command may be manually entered by a user at any time. Manual entry of a reduced functionality checkout procedure command may be in response to a determination that network traffic satisfies or may have the potential to satisfy one or more threshold values. In some examples, a user may enter a reduced functionality checkout procedure command at times when network traffic at the website satisfies one or more threshold levels or is predicted to satisfy one or more threshold levels.

As another example, checkout procedure module 46 may automatically transition from the full checkout procedure to the reduced functionality checkout procedure in response to a determination (e.g., by network analyzer 50) that network traffic associated with the website satisfies one or more threshold values. For instance, network analyzer 50 may determine that the network traffic satisfies the threshold value in response to determining that available network bandwidth of computing device 30 is less than (or equal to) a minimum bandwidth value, network throughput of computing device 30 is greater than (or equal to) a maximum throughput value, a number of client devices (e.g., clients 12) accessing computing device 30 (e.g., to access the website presented by web server 20) is greater than (or equal to) a maximum number of client devices, or other measures of network traffic.

Network analyzer 50 may provide an indication that the network traffic satisfies one or more threshold values. Checkout procedure module 46 may, in turn, transition from the full checkout procedure to the reduced functionality checkout procedure based on, for example, receipt of a command manually entered by a user or automatically based on receipt of the indication from network analyzer 50 that the network traffic satisfies one or more threshold values.

Likewise, checkout procedure module 46 may transition from the reduced functionality checkout procedure to the full checkout procedure. For example, checkout procedure module 46 may transition from the reduced functionality checkout procedure based on receipt of an indication of a configuration command to transition from the reduced functionality checkout procedure to the full checkout procedure manually entered by a user. As another example, checkout procedure module 46 may automatically transition from the reduced functionality checkout procedure based on receiving an indication that network traffic associated with the website satisfies one or more threshold values for the full functionality checkout procedure (e.g., available network bandwidth of computing device 30 is greater than a minimum bandwidth value, network throughput of computing device 30 is less than a maximum throughput value, a number of client devices and/or sessions associated with the website is less than a maximum value, etc.).

The full checkout procedure may include calculations corresponding to a set of parameters associated with an electronic commerce (e-commerce) transaction. Examples of the set of parameters associated with the e-commerce transaction included in the full checkout procedure may include, but are not limited to, checkout summary parameters, promotion line evaluation parameters, promotional code redemption parameters, gift wrapping and gift messaging parameters, multiple shipping parameters, and extended service plan parameters. The reduced functionality checkout procedure may include calculations corresponding to a subset of the parameters associated with the e-commerce transaction. For example, each of the full checkout procedure and the reduced functionality checkout procedure may include a plurality of checkout pages. The plurality of checkout pages may include one or more preliminary checkout pages and a final checkout page, as is further described below.

Figure 4:
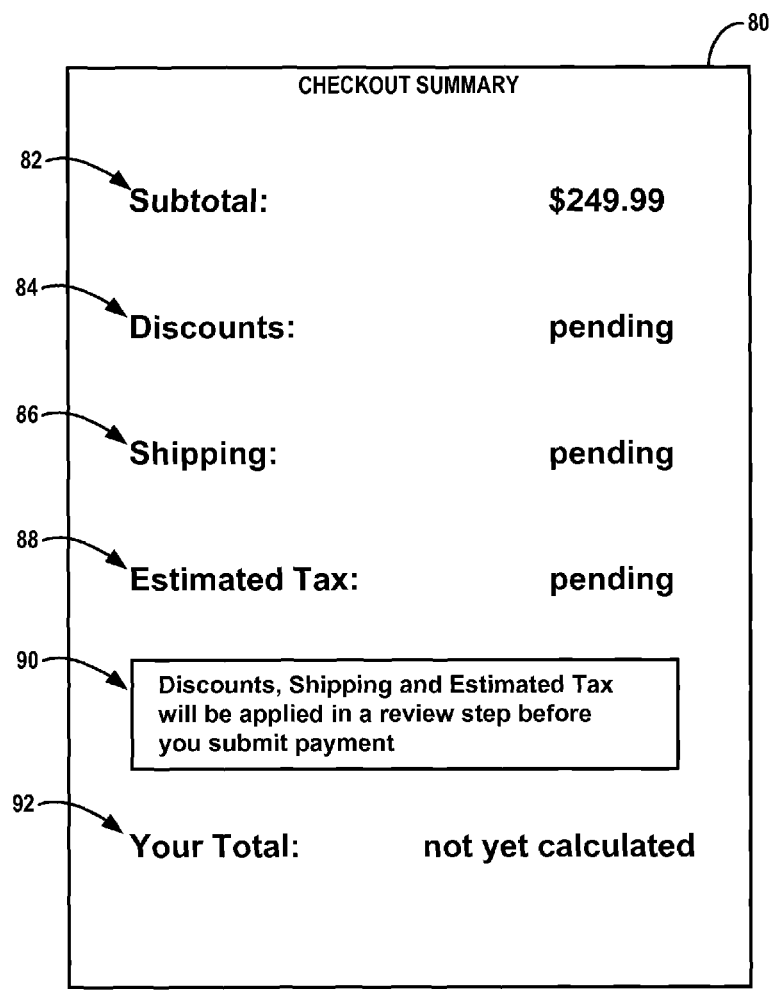
FIG. 4 is a block diagram illustrating example information that may be included in a checkout procedure of a website, in accordance with one or more aspects of this disclosure.

As illustrated in the example of FIG. 4, one or more of the preliminary checkout pages may include parameters associated with checkout summary information. For example, as illustrated, checkout summary information 80 may include subtotal parameter 82 corresponding to a sum of the costs of one or more products associated with the e-commerce transaction. Similarly, checkout summary information 80 may include discount parameter 84 corresponding to a sum of one or more discounts associated with the e-commerce transaction, shipping cost parameter 86 corresponding to a shipping cost associated with the e-commerce transaction (e.g., a cost to ship one or more products associated with the e-commerce transaction to a physical shipping address), estimated tax parameter 88 corresponding to an estimated tax associated with the e-commerce transaction (e.g., an estimated tax to be applied to products and/or services associated with the e-commerce transaction), and total cost parameter 92 corresponding to a sum of values associated with subtotal parameter 82, shipping cost parameter 86 and estimated tax parameter 88, less the value associated with discount parameter 84.

Transaction module 48 of checkout engine 22 may perform calculations associated with the set of checkout summary parameters at one or more of the preliminary checkout pages and/or final checkout page during execution of the full checkout procedure. That is, transaction module 48, during execution of the full checkout procedure, may request information from one or more of client devices 12 associated with the e-commerce transaction corresponding to the set of parameters, retrieve information associated with the e-commerce transaction from data repository 24, perform calculations corresponding to the set of parameters, and present results of the calculations corresponding to the set of parameters at one or more of the preliminary checkout pages and/or the final checkout page. In contrast, transaction module 48, during execution of the reduced functionality checkout procedure, may perform calculations corresponding to a subset of the checkout summary parameters (i.e., some, but not all of the set of parameters associated with the e-commerce transaction), and present results of the calculations corresponding to the subset of parameters at one or more of the preliminary checkout pages.

As illustrated in FIG. 4, transaction module 48 may perform calculations associated with subtotal parameter 82 during execution of the reduced functionality checkout procedure and present results 83 at one or more of the preliminary checkout pages. Transaction module 48 may refrain from performing, during execution of the reduced functionality checkout procedure, calculations corresponding to discount parameter 84, shipping cost parameter 86, estimated tax parameter 88, and total cost parameter 82. As such, transaction module 48 may reduce calculations and corresponding network traffic associated with the e-commerce transaction during execution of the reduced functionality checkout procedure. As illustrated in FIG. 4, transaction module 48 may present a result for those parameters included in the full set of parameters that are not included in the subset of parameters (i.e., discount parameter 84, shipping cost parameter 86, estimated tax parameter 88, and total cost parameter 92 in this example), indicating that calculations associated with those parameters are pending. For instance, transaction module 48 may present result 85, indicating that calculations associated with discount parameter 84 have not been calculated, but will be calculated prior to finalizing the e-commerce transaction. Similarly, transaction module 48 may present status message 90 indicating that calculations associated with one or more parameters are pending, such that the calculations have not been performed but are scheduled to be performed prior to finalizing the transaction (e.g., at a final checkout page of the reduced functionality checkout procedure).

Figure 5A:
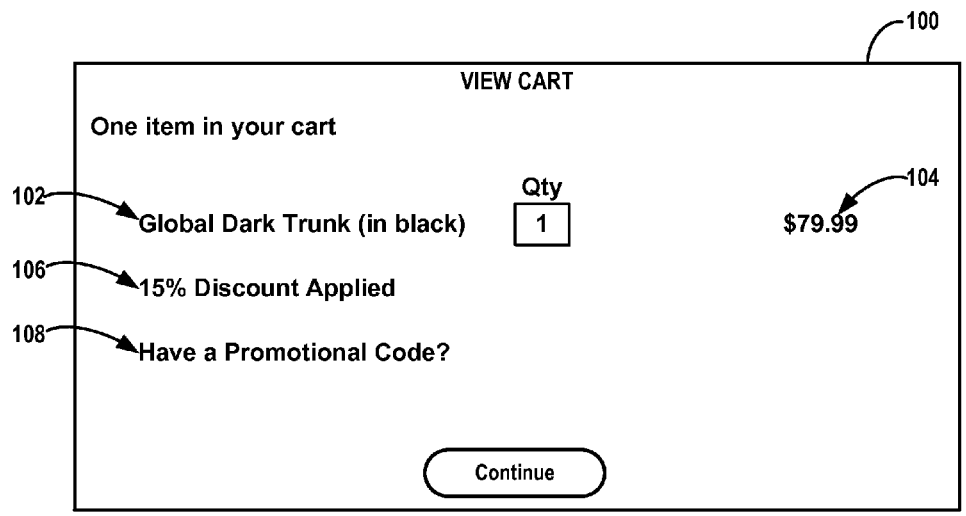
FIG. 5A is a block diagram illustrating an example view cart page that may be presented during execution of a full checkout procedure, in accordance with one or more aspects of this disclosure.
Figure 5B:
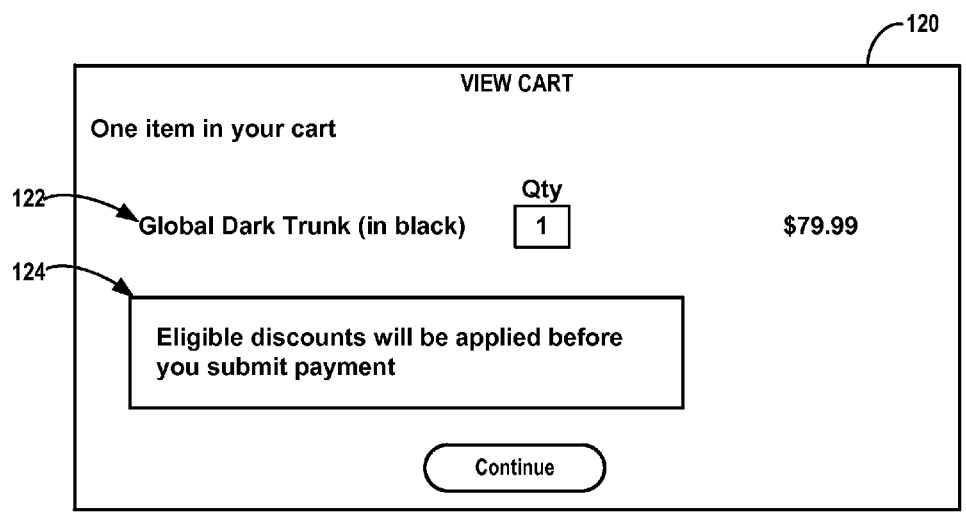
FIG. 5B is a block diagram illustrating an example view cart page that may be presented during execution of a reduced functionality checkout procedure, in accordance with one or more aspects of this disclosure.

As another example, and as illustrated in FIGS. 5A-5B, the one or more preliminary checkout pages may include a view cart page. FIG. 5A illustrates an example of a view cart page as presented during execution of a full checkout procedure. FIG. 5B illustrates an example of a view cart page as presented during execution of a reduced functionality checkout procedure.

As illustrated in FIG. 5A, transaction module 48 may present view cart page 100 during execution of a full checkout procedure. View cart page 100 may include a set of parameters including item identification parameter 102, item cost parameter 104, order line promotion evaluation parameter 106, and promotional code redemption parameter 108. In certain examples, transaction module view cart page 100 may present checkout summary information within view cart page 100, such as checkout summary information 80 described above with respect to FIG. 4. Similarly, in examples where the e-commerce transaction is associated with multiple products and/or services, view cart page 100 may include multiple parameters associated with one or more of the products and/or services associated with the e-commerce transaction.

As illustrated, item identification parameter 102 may include information such as item description information and quantity information (i.e., a number of units of the item associated with the e-commerce transaction). Item cost parameter 104 may include information corresponding to the monetary cost of the product and/or service. Order line promotion evaluation parameter 106 may include information corresponding to promotional discounts associated with the item and/or e-commerce transaction. For example, transaction module 48 may traverse a list of items included in the e-commerce transaction to determine whether promotional discounts apply to the e-commerce transaction. For instance, transaction module 48 may access data repository 24 to determine whether products and/or services associated with the e-commerce transaction satisfy a promotional criteria, such as a minimum monetary cost, a particular category of product and/or service, a time of purchase of a product and/or service associated with the e-commerce transaction, combinations of such criteria, and the like. In examples, where transaction module 48 determines that products and/or services associated with the e-commerce transaction satisfy one or more promotional criteria, transaction module 48 may present results of the promotional calculations at view cart page 100. Similarly, as further illustrated in FIG. 5A, transaction module 48 may present promotional code redemption parameter 108 (e.g., an input field, link to a promotional code entry page, etc.) that may enable a user to enter one or more promotional codes to redeem discounts to the cost of one or more products and/or services associated with the e-commerce transaction. In examples where a promotional code is entered via promotional code parameter 108, transaction module 48 may determine whether the promotional code entered via parameter 108 satisfies one or more promotional criteria, and may present results of one or more discounts associated with the promotional code, such as at order line promotion evaluation parameter 106.

As illustrated in the example of FIG. 5B, transaction module 48 may present view cart page 120 during execution of a reduced functionality checkout procedure. View cart page 120 may include a subset of parameters associated with the view cart page of the full checkout procedure. For example, as illustrated, view cart page 120 may include item identification parameter 122, which may be substantially similar to item identification parameter 102 included in the full checkout procedure and described above with respect to the example of FIG. 5A. However, as illustrated in FIG. 5B, transaction module 48, during execution of a reduced functionality checkout procedure, may not present parameters associated with order line promotion evaluation and/or promotional code redemption parameters within view cart page 120. In some examples, such as the example of FIG. 5B, transaction module 48 may present one or more results indicating that calculations associated with one or more parameters are pending. For instance, transaction module 48 may present notification 124 indicating that calculations corresponding to order line promotion evaluations and/or promotional code redemption parameters (e.g., parameters 106 and 108 of FIG. 5A) are pending and will be performed prior to finalizing the e-commerce transaction. Similarly, in some examples, view cart page 120 may present cart summary information corresponding to a subset of parameters, such as cart summary information 80 described above with respect to FIG. 4.

Accordingly, transaction module 48 may reduce calculations and corresponding network traffic associated with presenting results corresponding to the reduced parameters (i.e., order line promotion evaluation and promotional code redemption parameters in this example). In this way, transaction module 48 may help to reduce network traffic associated with customer checkout, such as during times of heavy network traffic associated with an e-commerce website.

Figure 6A:
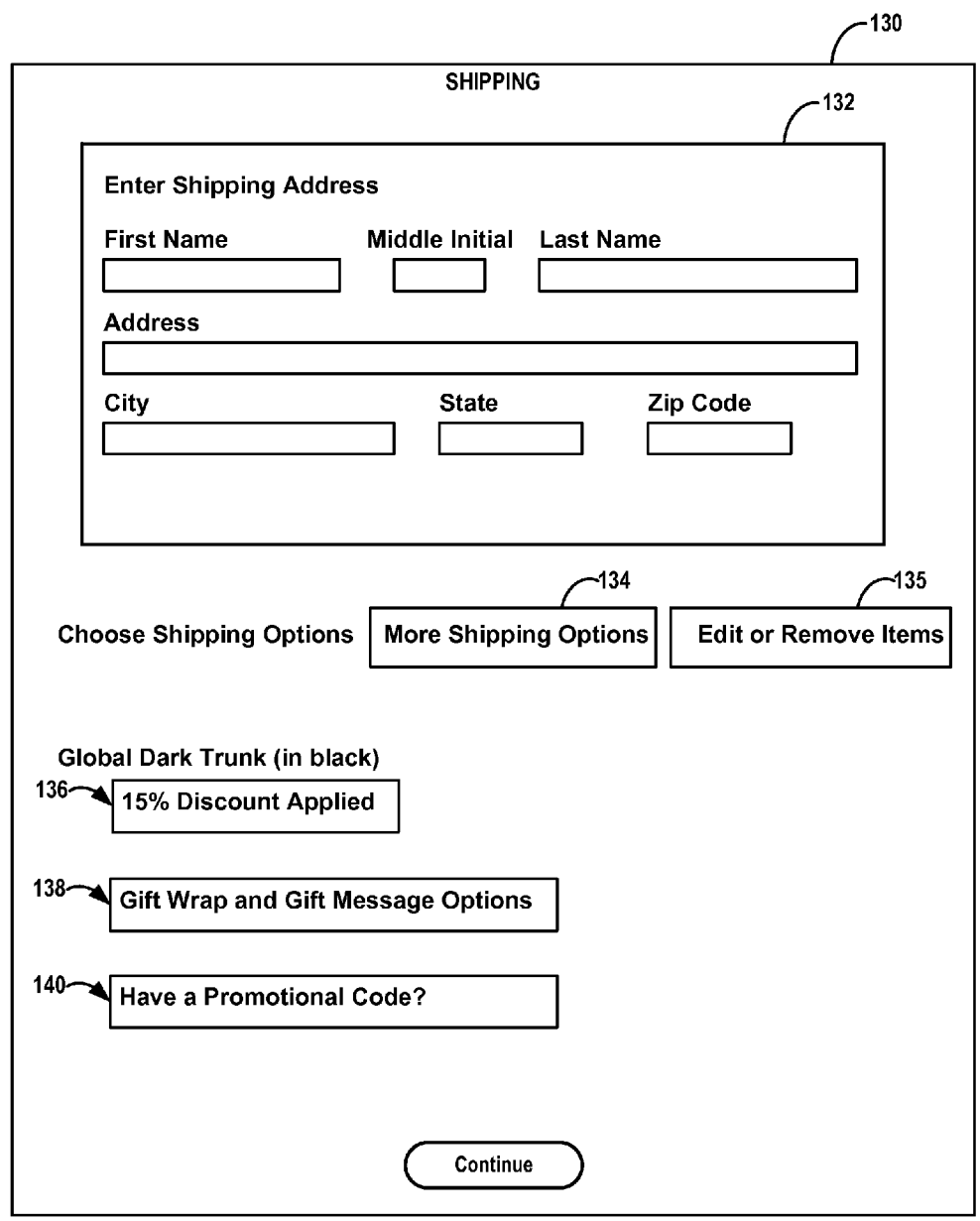
FIG. 6A is a block diagram illustrating an example shipping page that may be presented during execution of a full checkout procedure, in accordance with one or more aspects of this disclosure.

As illustrated in the examples of FIGS. 6A-6B, the plurality of preliminary checkout pages may include a shipping page. FIG. 6A illustrates an example of a shipping page as presented during execution of a full checkout procedure. FIG. 6B illustrates an example of a shipping page as presented during execution of a reduced functionality checkout procedure.

As illustrated in FIG. 6A, transaction module 48 may present, during execution of a full checkout procedure, shipping page 130. Shipping page 130 may include shipping address parameter 132, multiple shipping parameter 134, shipping edit parameter 135, order line promotion evaluation parameter 136, gift wrapping and/or gift messaging parameter 138, and promotional code redemption parameter 140. Shipping address parameter 132 may correspond to physical shipping address information to which one or more products associated with the e-commerce transaction are to be shipped. Multiple shipping parameter 134 may correspond to and/or enable a user to provide shipping information, such as multiple physical shipping addresses to which one or more products associated with the e-commerce transaction are to be shipped. Shipping edit parameter 135 may correspond to and/or enable a user to modify shipping information relating to one or more products associated with the e-commerce transaction, such as by enabling a user to change a physical shipping address associated with one or more products, remove one or more products from the list of items to be shipped, etc.

Gift wrapping and/or gift messaging parameter 138 may correspond to and/or enable a user to request gift wrapping and/or one or more messages to be included with a product associated with the e-commerce transaction. For instance, the one or more preliminary checkout pages included in the full checkout procedure may include a gift wrap and/or gift message page. Transaction module 48 may present the gift wrap and/or gift message page during execution of a full checkout procedure and in response to receiving an indication of selection of gift wrapping and/or gift messaging parameter 138 (e.g., a hyperlink). Similarly, the one or more preliminary checkout pages included in the full checkout procedure may include a multiple shipping page. Transaction module 48 may present the multiple shipping page during execution of the full checkout procedure and in response to receiving an indication of selection of multiple shipping parameter 134 (e.g., a hyperlink). Order line promotion evaluation parameter 136 may be substantially similar to order line promotion evaluation parameter 108 as and promotional code redemption parameter 140 may be substantially similar to order line promotion evaluation parameter 106 as described above with respect to FIG. 5A. Similarly, promotional code redemption parameter 140 may be substantially similar to promotional code redemption parameter 108 as described above with respect to FIG. 5A. In some examples, transaction module 48 may present checkout summary information at shipping page 130, such as checkout summary information 80 described above with respect to FIG. 4.

FIG. 6B illustrates an example shipping page 150 as presented during execution of a reduced functionality checkout procedure. As illustrated in the example of FIG. 6B, shipping page 150 may include shipping address parameter 152 and shipping edit parameter 155. In some examples, shipping page 150 may include checkout summary information, such as checkout summary information 80 as described above with respect to FIG. 4. Shipping address parameter 152 may be substantially similar to shipping address parameter 132 described above with respect to FIG. 6A, such that shipping address parameter 152 corresponds to and/or enables a user to submit physical shipping address information to which one or more products associated with the e-commerce transaction are to be shipped. Similarly, shipping edit parameter 155 may be substantially similar to shipping edit parameter 135 described above with respect to FIG. 6A, such that shipping edit parameter 135 may enable a user to modify shipping information with respect to one or more products associated with the e-commerce transaction.

As illustrated in FIG. 6B, transaction module 48 may execute the reduced functionality checkout procedure such that one or more of a multiple shipping parameter, a gift wrap and/or gift message parameter, and a promotional code redemption parameter are not presented at shipping page 150. That is, transaction module 48 may refrain from presenting one or more of such parameters at shipping page 150, such that functionality corresponding to and/or attributed to such parameters is not available at the shipping page of the reduced functionality checkout procedure. In this way, transaction module 48 may reduce calculations and associated network traffic corresponding to information associated with such parameters. That is, by refraining from presenting such parameters at shipping page 150 during execution of the reduced functionality checkout procedure, transaction module 48 may prevent a user from accessing such parameters and thereby prevent transmission of data associated with the parameters. In addition, transaction module 48 may present notification 156 corresponding to an order line promotion evaluation parameter, indicating that calculations associated with the order line promotion evaluation parameter have not been performed but are scheduled to be performed prior to finalizing the e-commerce transaction. Accordingly, according to techniques disclosed here, transaction module 48 may reduce calculations and corresponding network traffic (e.g., between computing device 30 and one or more of clients 12) during a checkout procedure of a website to complete an e-commerce transaction.

Figure 7A:
FIG. 7A is a block diagram illustrating an example edit cart page that may be presented during execution of a full checkout procedure, in accordance with one or more aspects of this disclosure.
Figure 7B:
FIG. 7B is a block diagram illustrating an example edit cart page that may be presented during execution of a reduced functionality checkout procedure, in accordance with one or more aspects of this disclosure.

As illustrated in the examples of FIGS. 7A-7B, the plurality of preliminary checkout pages may include an edit cart page. FIG. 7A illustrates an example of an edit cart page as presented during execution of a full checkout procedure. FIG. 7B illustrates an example of an edit cart page as presented during execution of a reduced functionality checkout procedure.

As illustrated in FIG. 7A, transaction module 48 may present, during execution of a full checkout procedure, edit cart page 160. Edit cart page 160 may include order line promotion evaluation parameter 162. As illustrated, order line promotion evaluation parameter 162 may include a plurality of promotional discounts corresponding to one or more products and/or services associated with the e-commerce transaction. Transaction module 48 may determine that one or more products and/or services associated with the e-commerce transaction satisfy one or more promotional criteria, such as by traversing a list of products associated with the e-commerce transaction and comparing the products to one or more promotional criteria (e.g., promotional criteria included in data repository 24). In response, transaction module 48 may present results of the promotional discounts associated with the one or more products and/or services at edit cart page 160.

FIG. 7B illustrates an example of edit cart page 164 as presented during execution of a reduced functionality checkout procedure. As illustrated in FIG. 7B, transaction module 48 may present, during execution of a reduced functionality checkout procedure, edit cart page 164. Edit cart page 164 may be substantially similar to edit cart page 160 described above with respect to FIG. 7A, with the exception of presentation of calculations corresponding to an order line promotion evaluation parameter. For instance, transaction module 48 may refrain from performing, during execution of the reduced functionality checkout procedure, calculations corresponding to an order line promotion evaluation parameter. Rather, transaction module 48 may present notification 166, indicating that calculations associated with promotional discounts are pending (e.g., have not been performed but will be performed prior to finalizing the e-commerce transaction). As such, transaction module 48 may reduce calculations and corresponding network traffic associated with a checkout procedure of an e-commerce website.

Figure 8A:
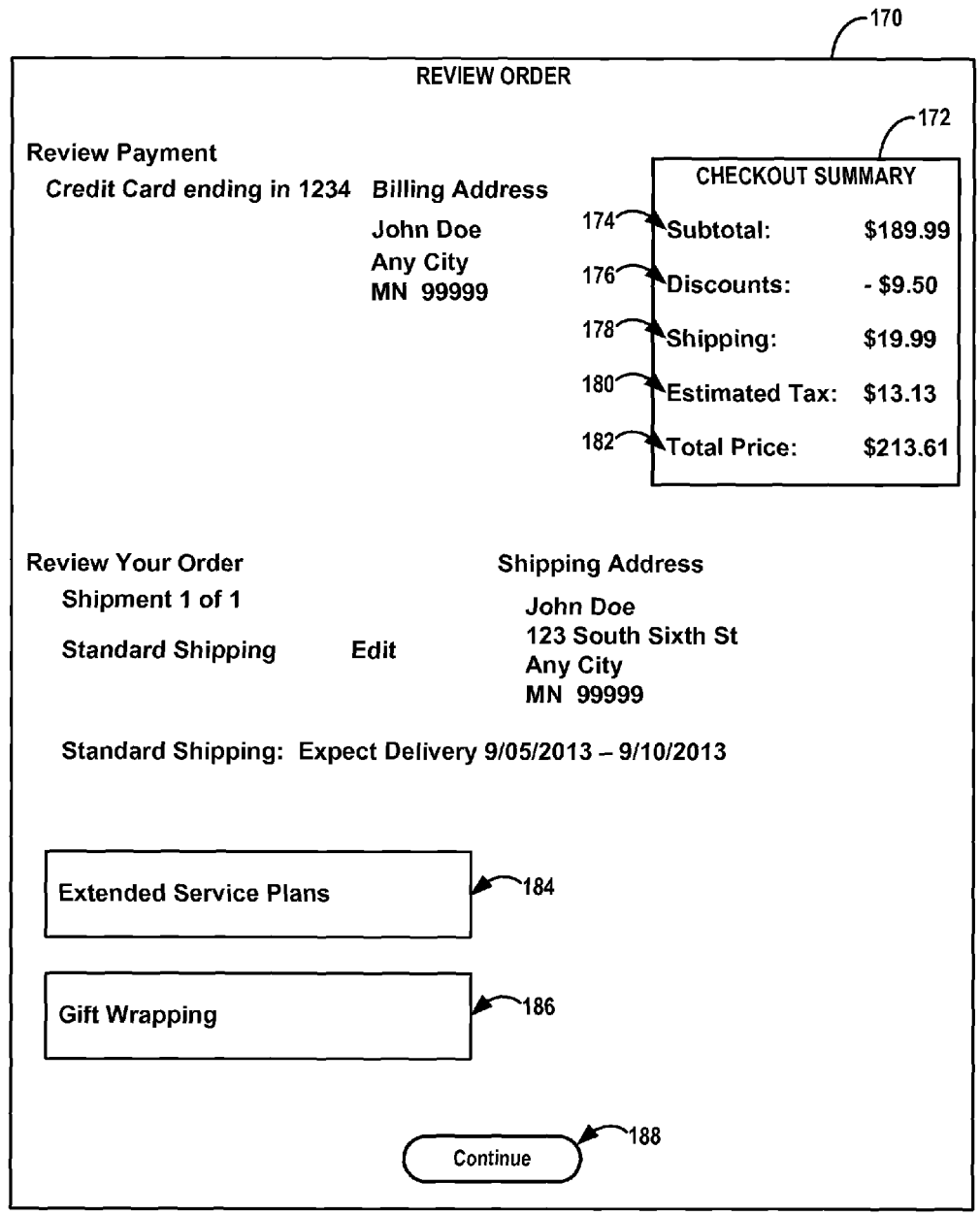
FIG. 8A is a block diagram illustrating an review order cart page that may be presented during execution of a full checkout procedure, in accordance with one or more aspects of this disclosure.
Figure 8B:
FIG. 8B is a block diagram illustrating an example review order page that may be presented during execution of a reduced functionality checkout procedure, in accordance with one or more aspects of this disclosure.

As illustrated in FIGS. 8A-8B, the plurality of checkout pages may include, in addition to one or more preliminary checkout pages, a final checkout page. The final checkout page may include an order review page or other such page that that presents an option to place an order for the products and/or services associated with the e-commerce transaction and thereby finalize the e-commerce transaction (e.g., by charging a credit card, debit card, check card, gift card, or other monetary transaction).

As an example, FIG. 8A illustrates an example order review page (i.e., final checkout page) as presented during execution of a full checkout procedure. FIG. 8B illustrates an example order review page (i.e., final checkout page) as presented during execution of a reduced functionality checkout procedure.

As illustrated in FIG. 8A, order review page 170 may include checkout summary information 172. Checkout summary information 172 may include a set of parameters including subtotal parameter 174 corresponding to a sum of the costs of one or more products and/or services associated with the e-commerce transaction, discount parameter 176 corresponding to a sum of one or more discounts associated with the e-commerce transaction, shipping cost parameter 178 corresponding to a shipping cost associated with the e-commerce transaction (e.g., a cost to ship one or more products associated with the e-commerce transaction to a physical shipping address), estimated tax parameter 180 corresponding to an estimated tax associated with the e-commerce transaction (e.g., an estimated tax to be applied to products and/or services associated with the e-commerce transaction), and total cost parameter 182 corresponding to a sum of values associated with subtotal parameter 174, shipping cost parameter 178 and estimated tax parameter 180, less the value associated with discount parameter 176. As illustrated, transaction module 48 may perform calculations and present corresponding results associated with each of the parameters included in checkout summary information 172.

As further illustrated in the example of FIG. 8A, order review page 170 may include extended service plan parameter 184 that may correspond to and/or enable a user to select extended service plan information (e.g., extended warranty plans, replacement plans, and the like) with respect to one or more products and/or services associated with the e-commerce transaction. For instance, the plurality of preliminary checkout pages included in the full checkout procedure may include an extended service plan page. Transaction module 48 may present the extended service plan page during execution of the full checkout procedure and in response to receiving an indication of selection of extended service plan parameter 184 (e.g., a hyperlink) Similarly, order review page 170 may include gift wrapping parameter 186 that may enable a user to select gift wrapping and/or gift messaging options. As further illustrated in FIG. 8A, order review page 170 (i.e., a final checkout page) may include order placement button 188. Transaction module 48 may finalize the e-commerce transaction in response to receiving an indication of selection of order placement button 188, such as by completing the monetary transaction by charging a credit card, debit card, check card, gift card, etc. associated with the e-commerce transaction.

FIG. 8B illustrates an example of order review page 190 as presented during execution of a reduced functionality checkout procedure. As illustrated in FIG. 8B, order review page 190 (i.e., a final checkout page) may include checkout summary information 192. Checkout summary information 192 may include a set of parameters including subtotal parameter 194, discount parameter 196, shipping cost parameter 198, estimated tax parameter 200, and total cost parameter 202. As illustrated, transaction module 48 may perform calculations and present corresponding results associated with each of the parameters included in checkout summary information 192. That is, transaction module 48 may perform calculations associated with the full set of parameters of checkout summary information associated with the e-commerce transaction and may present the corresponding results at order review page 190 (i.e., a final checkout page). In this way, transaction module 48 may present information associated with the full set of parameters prior to finalizing the e-commerce transaction. Accordingly, transaction module 48 may reduce calculations associated with the e-commerce transaction by delaying calculations associated with certain parameters until presentation at a final checkout page.

In addition, as illustrated in FIG. 8B, transaction module 48 may refrain from presenting at order review page 190 one or more of extended service plan and gift wrapping parameters. In this way, transaction module 48 may further reduce calculations and corresponding network traffic associated with a checkout procedure of an e-commerce website.

Referring again to FIG. 4, transaction module 48, executing on one or more processors 38 of computing device 30, may receive a request to complete an e-commerce transaction via the website (62). For example, transaction module 48 may receive an indication of a selection of a "checkout" option, such as a selection of a virtual button or other selectable element associated with a checkout procedure of the website. In response to receiving the request to complete the e-commerce transaction, transaction module 48 may execute the reduced functionality checkout procedure (64). For example, transaction module 48 may perform a subset of calculations associated with the e-commerce transaction, the subset including some, but not all of the parameters included in a full checkout procedure. Transaction module 48 may present results of the subset of calculations at one or more preliminary checkout pages of the reduced functionality checkout procedure. Transaction module 48 may present results of the set of calculations at a final checkout page, such as an order review page that presents an option to finalize the e-commerce transaction (e.g., by charging a credit card or other form of payment).

Transaction module 48 may receive a request to finalize the e-commerce transaction (66). For instance, transaction module 48 may receive an indication of a selection of an order placement button or other selectable object presented at a final checkout page of the plurality of checkout pages. In response to receiving the request, transaction module 48 may finalize the e-commerce transaction (68). As an example, transaction module 48 may complete the monetary transaction to purchase the one or more products and/or services associated the e-commerce transaction, such as by charging a credit card, debit card, check card, gift card, or other form of payment submitted during the checkout procedure.

According to techniques described herein, a computing device may decrease calculations and corresponding network traffic associated with a checkout procedure of an e-commerce website. As such, the techniques may enable a user to browse for products and/or services available for purchase via an e-commerce website associated with a retailer even during periods of heavy network traffic due to, for example, a holiday shopping season or promotional sales event. Accordingly, the techniques may increase sales throughput via the website and improve customer satisfaction.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include any type of non-transitory computer readable storage media, such as random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
   determining, by a network analyzer of a server system, an amount of network traffic associated with a website;
   determining, by the network analyzer of the server system, that the network traffic associated with the website satisfies a threshold;
   causing, by the network analyzer of the server system, a checkout engine to transition from a full checkout procedure of the website to a reduced functionality checkout procedure of the website upon determining that the network traffic associated with the website satisfies the threshold, wherein the full checkout procedure comprises calculations corresponding to a set of parameters associated with an electronic commerce transaction, and wherein the reduced functionality checkout procedure comprises calculations corresponding to a subset of the parameters associated with the electronic commerce transaction;

receiving, by the server system and from a client device, a request to complete the electronic commerce transaction via the website; and in response to receiving the request to complete the electronic commerce transaction, executing, by the server system, the reduced functionality checkout procedure.

2. The method of claim 1, wherein transitioning from the full checkout procedure to the reduced functionality checkout procedure comprises transitioning from the full checkout procedure to the reduced functionality checkout procedure in response to receiving, by the server system, an indication of a configuration command to transition from the full checkout procedure to the reduced functionality checkout procedure.

3. The method of claim 1, wherein the threshold value includes at least one of a threshold network bandwidth, a threshold number of client devices accessing the website, and a threshold amount of network data traffic associated with the website.

4. The method of claim 1, wherein executing the reduced functionality checkout procedure comprises performing the calculations corresponding to the subset of the parameters associated with the electronic commerce transaction.

5. The method of claim 1,
wherein each of the reduced functionality checkout procedure and the full checkout procedure comprise a plurality of checkout pages, the plurality of checkout pages of each of the reduced functionality checkout procedure and the full checkout procedure including one or more preliminary checkout pages and a final checkout page, and wherein executing the reduced functionality checkout procedure comprises:

performing the calculations corresponding to the subset of the parameters associated with the electronic commerce transaction; and presenting results of one or more of the calculations corresponding to the subset of parameters at one or more of the one or more preliminary checkout pages.

6. The method of claim 5, wherein one or more of the preliminary checkout pages include checkout summary information, the checkout summary information comprising:

a first parameter corresponding to a subtotal comprising a sum of the costs of one or more products associated with the electronic commerce transaction;

a second parameter corresponding to a sum of one or more discounts associated with the electronic commerce transaction;

a third parameter corresponding to a shipping cost associated with the electronic commerce transaction;

a fourth parameter corresponding to an estimated tax associated with the electronic commerce transaction; and a fifth parameter corresponding to a total comprising a sum of the first parameter corresponding to the subtotal, the third parameter corresponding to the shipping cost, and the fourth parameter corresponding to the estimated tax, less the second parameter corresponding to the sum of the one or more discounts applied to the subtotal, wherein presenting results of one or more of the calculations corresponding to the subset of parameters at one or more of the preliminary checkout pages comprises presenting results of calculations associated with only the first parameter corresponding at one or more of the preliminary checkout pages.

7. The method of claim 6, wherein presenting results of one or more of the calculations corresponding to the subset of parameters at one or more of the preliminary checkout pages comprises presenting at least one indication that one or more calculations corresponding to the set of parameters are pending.

8. The method of claim 5, wherein the one or more preliminary checkout pages include a view cart page, wherein the set of parameters associated with the electronic commerce transaction included in the full checkout procedure comprises an order line promotion evaluation parameter and a promotional code redemption parameter, and wherein executing the reduced functionality checkout procedure comprises presenting the view cart page without presenting the order line promotion evaluation parameter and the promotional code redemption parameter.

9. The method of claim 5,
wherein the one or more preliminary checkout pages include a shipping page,
wherein the set of parameters associated with the electronic commerce transaction included in the full checkout procedure comprises:
a multiple shipping parameter;
a gift wrap parameter; and
a gift messaging parameter, and
wherein executing the reduced functionality checkout procedure comprises presenting the shipping page without presenting the multiple shipping parameter, the gift wrap parameter, and the gift messaging parameter.

10. The method of claim 5,
wherein the one or more preliminary checkout pages included in the full checkout procedure comprises a multiple shipping page, a gift wrap page, and an extended service plan page, and
wherein executing the reduced functionality checkout procedure comprises executing the reduced functionality checkout procedure without including the multiple shipping page, the gift wrap page, and the extended service plan page within the plurality of preliminary checkout pages of the reduced functionality checkout procedure.

11. The method of claim 5,
wherein the one or more preliminary checkout pages include an edit cart page,
wherein the set of parameters associated with the electronic commerce transaction included in the full checkout procedure comprises an order line promotion evaluation parameter, and
wherein executing the reduced functionality checkout procedure comprises presenting the edit cart page without presenting the order line promotion evaluation parameter.

12. The method of claim 5, wherein executing the reduced functionality checkout procedure further comprises:

performing the calculations corresponding to the set of the parameters associated with the electronic commerce transaction; and presenting results of one or more of the calculations corresponding to the set of parameters at the final checkout page.

13. The method of claim 1, further comprising:
in response to receiving a request from the client device to finalize the electronic commerce transaction, finalizing, by the server system, the electronic commerce transaction by completing a monetary transaction corresponding to the electronic commerce transaction.

14. A system comprising:
    at least one server device, wherein the server device comprises:
        a network analyzer configured to determine an amount of network traffic associated with a website, and
        a checkout engine,
        wherein the network analyzer determines that the amount of network traffic associated with the website satisfies a threshold and causes the checkout engine to transition from a full checkout procedure of a website to a reduced functionality checkout procedure of the website, wherein the full checkout procedure comprises calculations corresponding to a set of parameters associated with an electronic commerce transaction, and wherein the reduced functionality checkout procedure comprises calculations corresponding to a subset of the parameters associated with the electronic commerce transaction; and
        at least one client device configured to transmit, to the at least one server device, a request to complete the electronic commerce transaction via the website,
        wherein the at least one server device is further configured to execute, in response to receiving the request to complete the electronic commerce transaction, the reduced functionality checkout procedure.

15. The system of claim 14, wherein the at least one server device is further configured to execute the reduced functionality checkout procedure by at least performing the calculations corresponding to the subset of the parameters associated with the electronic commerce transaction.

16. The system of claim 14,
    wherein each of the reduced functionality checkout procedure and the full checkout procedure comprise a plurality of checkout pages, the plurality of checkout pages of each of the reduced functionality checkout procedure and the full checkout procedure including one or more preliminary checkout pages and a final checkout page, and
    wherein the at least one server device is further configured to execute the reduced functionality checkout procedure by at least:
        performing the calculations corresponding to the subset of the parameters associated with the electronic commerce transaction; and
        presenting results of one or more of the calculations corresponding to the subset of parameters at one or more of the one or more preliminary checkout pages.

17. The system of claim 16, wherein one or more of the preliminary checkout pages include checkout summary information, the checkout summary information comprising:
    a first parameter corresponding to a subtotal comprising a sum of the costs of one or more products associated with the electronic commerce transaction;
    a second parameter corresponding to a sum of one or more discounts associated with the electronic commerce transaction;
    a third parameter corresponding to a shipping cost associated with the electronic commerce transaction;
    a fourth parameter corresponding to an estimated tax associated with the electronic commerce transaction; and
    a fifth parameter corresponding to a total comprising a sum of the first parameter corresponding to the subtotal, the third parameter corresponding to the shipping cost, and the fourth parameter corresponding to the estimated tax, less the second parameter corresponding to the sum of the one or more discounts applied to the subtotal,
    wherein the at least one server device is further configured to present the results of one or more of the calculations corresponding to the subset of parameters at one or more of the preliminary checkout pages by at least presenting results of calculations associated with only the first parameter corresponding at one or more of the preliminary checkout pages.

18. The system of claim 17, wherein the at least one server device is further configured to present results of one or more of the calculations corresponding to the subset of parameters at one or more of the preliminary checkout pages by at least presenting at least one indication that one or more calculations corresponding to the set of parameters are pending.

19. A non-transitory computer-readable storage medium comprising instructions that, when executed, cause at least one processor of a computing device to:
    determine, by a network analyzer of a server system, an amount of network traffic associated with a website;
    determine, with the network analyzer, that the amount of network traffic associated with a website satisfies a threshold;
    upon determining by the network analyzer that the amount of network traffic associated with the website satisfies the threshold, cause a checkout engine to transition from a full checkout procedure of a website to a reduced functionality checkout procedure of the website, wherein the full checkout procedure comprises calculations corresponding to a set of parameters associated with an electronic commerce transaction, and wherein the reduced functionality checkout procedure comprises calculations corresponding to a subset of the parameters associated with the electronic commerce transaction;
    receive a request to complete the electronic commerce transaction via the website; and
    in response to receiving the request to complete the electronic commerce transaction, execute the reduced functionality checkout procedure.

* * * * *